(12) United States Patent
Sandstad (10) Patent No.: US 12,108,743 B2
(45) Date of Patent: Oct. 8, 2024

(54) RAISEABLE FLOATING STRUCTURE AND A METHOD FOR RAISING THE SAME IN A WATER COLUMN

(71) Applicant: Spring Innovation AS, Stavanger (NO)

(72) Inventor: Alf Reidar Sandstad, Stavanger (NO)

(73) Assignee: Spring Innovation AS, Stavanger (NO)

(*) Notice: Subject to any disclaimer, the term of this patent is extended or adjusted under 35 U.S.C. 154(b) by 539 days.

(21) Appl. No.: 17/275,026

(22) PCT Filed: Sep. 12, 2019

(86) PCT No.: PCT/NO2019/050185
§ 371 (c)(1),
(2) Date: Mar. 10, 2021

(87) PCT Pub. No.: WO2020/055268
PCT Pub. Date: Mar. 19, 2020

(65) Prior Publication Data
US 2022/0061277 A1 Mar. 3, 2022

(30) Foreign Application Priority Data
Sep. 13, 2018 (NO) .................................. 20181197

(51) Int. Cl.
*A01K 61/60* (2017.01)
(52) U.S. Cl.
CPC .................................. *A01K 61/60* (2017.01)
(58) Field of Classification Search
CPC .................................................... A01K 61/60
USPC ........................................ 119/223, 452–454
See application file for complete search history.

(56) References Cited

U.S. PATENT DOCUMENTS

| 5,375,550 A | 12/1994 | Innis |
| 5,845,602 A * | 12/1998 | Kaarstad ................ A01K 61/60 119/223 |
| 5,967,086 A | 10/1999 | Knott, Sr. |
| 10,357,023 B2 * | 7/2019 | DePaola ................ B63B 35/38 |

FOREIGN PATENT DOCUMENTS

| CN | 105994065 A | 10/2016 | |
| CN | 107094676 A * | 8/2017 | ............ A01K 61/40 |
| EP | 0076151 A2 * | 4/1983 | ............ A01K 61/60 |
| KR | 20150020374 | 2/2015 | |
| NO | 336739 | 10/2015 | |
| NO | 20172017 | 10/2017 | |

(Continued)

OTHER PUBLICATIONS

Norwegian Search Report for No. 20181197, dated Jan. 11, 2019.
The International Search Report & Written Opinion for PCT/NO2019/050185, dated Nov. 13, 2019.

*Primary Examiner* — Peter M Poon
*Assistant Examiner* — Danielle A Clerkley
(74) *Attorney, Agent, or Firm* — Andrus Intellectual Property Law, LLP (57) ABSTRACT

A floatable structure has a cage with a surrounding wall and a bottom, the cage being arranged for fish farming. A surrounding skirt extends in a downward direction from the bottom, wherein at least a portion of the bottom from the skirt towards a center of the cage is tight. The portion of the bottom and the skirt forming a bottom section are arranged to be filled with a gas giving the floatable structure additional buoyancy.

15 Claims, 4 Drawing Sheets

(56) References Cited

FOREIGN PATENT DOCUMENTS

| | | | |
|---|---|---|---|
| NO | 342778 | 8/2018 | |
| NO | 20170298 | 9/2018 | |
| WO | 8704319 A1 | 7/1987 | |
| WO | 0072669 | 7/2000 | |
| WO | WO-0165925 A1 * | 9/2001 | ............ A01K 61/60 |
| WO | 2010/016769 | 2/2010 | |
| WO | 2010/099590 | 9/2010 | |

* cited by examiner

RAISEABLE FLOATING STRUCTURE AND A METHOD FOR RAISING THE SAME IN A WATER COLUMN

CROSS-REFERENCE TO RELATED APPLICATIONS

This application is the U.S. national stage application of International Application PCT/NO2019/050185, filed Sep. 12, 2019, which international application was published on Mar. 19, 2020, as International Publication WO 2020/055268 in the English language. The International Application claims priority of Norwegian Patent Application No. 20181197, filed Sep. 13, 2018. The international application and Norwegian application are both incorporated herein by reference, in entirety.

This invention relates to a floatable structure comprising a cage for fish farming. More specifically, the invention relates to a floatable structure comprising a bottom section arranged to be filled with a gas giving the floatable structure an additional buoyancy for raising the floatable structure in a water column. A method for raising the floatable structure is also described.

PRIOR ART AND THEIR DISADVANTAGES

Floating flexible fish cages usually comprise a circular and flexible floating element and a flexible cage. Floating flexible fish cages are typically located inshore, for instance in a fjord or lush water. A benefit of the inshore location is that the floating flexible fish cage may be protected from rough sea and strong wind. A disadvantage by the inshore location is for instance contamination from faeces and food, especially in locations with low exchange of water.

The flexible cage is typically made by a water permeable net allowing water to flow through the cage. A problem with the water permeable net, is that the fish are exposed to harmful fish lice and algae. To prevent fish lice and algae and reduce the contamination, it is known by prior art to replace the permeable net with a dense material such as tarpaulin or a watertight cloth. Patent document WO2010/016769 describes an example of a floating flexible cage, said cage comprising a watertight tarpaulin.

An alternative solution for reducing said problems, is to farm fish offshore. To withstand rough sea and strong wind offshore, the aquaculture industry needs fish cages with solid structures. The solid structure may be formed by concrete or steel. The cage may be water permeable or closed. The closed cage may be formed by a tarpaulin or a watertight cloth or a solid wall. The solid wall may be formed by concrete or steel. Patent document WO2010/099590 describes an example of a solid closed fish cage.

Most fish cages need regular maintenance. A net or a tarpaulin may be lifted out of the sea and transported to shore if necessary.

A solid structure is difficult to move and must be maintained on location. The inside of a closed cage may be maintained in fresh air by pumping out the water. As the water is pumped out, the solid structure with the closed cage may rise in the water due to an internal or an added buoyancy. The closed cage comprises a wall and a tight bottom, the tight bottom being the bottom of the closed cage. An upper part of the outside of the wall may be maintained in dry conditions from a floating service means, for instance a service boat. A lower part of the floating cage, including a lower part of the wall, will always stay submerged and below the water surface. The lower part of the closed cage may comprise an infrastructure arranged below the tight bottom. Said infrastructure may for instance comprise water lines and an anchor attachment.

The submerged parts are exposed to algae bursting and corrosion. Regular inspection and maintenance are therefore required. A submerged maintenance operation may require special equipment, for instance an ROV (remote operated vehicle) or a diver. Using a ROV or a diver is a comprehensive and costly operation. Submerged maintenance like grinding is possible, but very difficult. Painting a submerged surface is also difficult. Thus, there is a need for alternative solutions for maintaining the submerged part of a solid floatable fish cage.

Patent document NO20172017 discloses a floating fish farming plant comprising a cage supported by a buoyant body which is configured for floating in a body of water. Lifting means are arranged between the buoyant body and the cage and configured for moving the cage between a position at the level of, or below, the buoyant body and a position in which at least a portion of the cage is above the buoyant body.

Patent document KR20150020374 discloses an apparatus for lifting a portion of a fish cage, the apparatus comprising a lifting tube positioned at a lower edge portion of the fish cage. The lifting tube is arranged for generating buoyancy by injecting air into the tube or generate ballast by removing air from the tube.

The present invention has for its object to remedy or to reduce at least one of the draw-backs of the prior art, or at least provide a useful alternative to prior art.

The object is achieved through features, which are specified in the description below and in the claims that follow.

GENERAL DESCRIPTION OF THE INVENTION

The invention is defined by the independent patent claims. The dependent claims define advantageous embodiments of the invention.

In a first aspect the invention relates more particularly to a floatable structure comprising a cage with a surrounding wall and a bottom, the cage being arranged for fish farming. A surrounding skirt extends in a downward direction from the bottom, wherein at least a portion of the bottom from the skirt towards a centre of the cage is tight, said portion of the bottom and the skirt forming a bottom section arranged to be filled with a gas giving the floatable structure additional buoyancy.

The downward direction is applicable when the floatable structure is in an operational position. Tight should be understood as not allowing a fluid, e.g. gas or water, to pass through. Tight can also be defined as impermeable. In one embodiment, the entire bottom may be tight. In one embodiment, one third of the bottom from the skirt towards the centre of the cage may be tight. In one embodiment, a half of the bottom from the skirt towards the centre of the cage may be tight. In one embodiment, three quarters of the bottom from the skirt towards the centre of the cage may be tight. In one embodiment, the bottom may also be tight from the skirt to the surrounding wall if the skirt is arranged closer to the centre of the cage than the surrounding wall.

In an embodiment where a part of the bottom is tight, the open portion of the bottom may be covered by a net, a cloth or another material for retaining fish in the cage.

The floatable structure may be formed from a rigid material, for example steel or concrete or a combination of different rigid materials. The effect of the rigid material is that the floatable structure may withstand rough seas and strong wind. The floatable structure may also carry heavy and large equipment, such as a crane and a feed silo. The floatable structure may comprise a fish cage with a larger volume than an open floating cage. The floatable structure comprises buoyancy arranged to keep the floatable structure floating in an operational position.

The effect of forming a bottom section arranged to be supplied with gas, is that the floatable structure may be raised in a water column without using a crane, a winch or adding external buoyancy to the floatable structure. The added buoyancy may be sufficient to raise the floatable structure, in such a way, such that the bottom is positioned above a water surface outside the floatable structure, typically a sea water surface.

The gas may for instance be air or helium or nitrogen. Using air instead of other gases is cheaper and more easily accessible, whilst other gases must be purchased and transported to the relevant location. The effect of using helium, is that helium has a lower density than air, and therefore gives more buoyancy per volume unit. Using nitrogen may kill organism within the bottom section and as such disinfect the bottom section.

Said gas may be compressed. Said gas may be a fluid with a lower density than water. Said gas may be applied by a compressor or a fan. Said gas may be supplied inside an air bottle or a container, for instance a small air ball, the ball being made of plastic. The effect of using air balls, is that the bottom section may have buoyancy even if an air leak should occur in the bottom section. If a possible leak, for instance a crack in a weld is smaller than the air ball, the air ball may stay inside the bottom section giving the floatable structure buoyancy.

The skirt comprises an upper edge and a lower edge. The skirt may be arranged as a vertical extension of the surrounding wall. The upper edge may be connected to an underside of the bottom. The skirt may be connected to the underside of the bottom at a distance from a lower edge of the surrounding wall, i.e. closer to a centre of the cage than the surrounding wall.

The bottom section may be open in a downwards direction, the bottom section forming an air bell or air trap. The effect of the air bell shape is that only a portion of the skirt will stay in the water when the cage and the bottom are raised above the sea water surface. In comparison, if a second bottom is added underneath the skirt, the second bottom will always be below the sea water surface, requiring submerged maintenance of the outside of the second bottom.

When the bottom is raised above the sea water surface, the height between the bottom and the sea water surface may be sufficient for a floating service means, for instance a service boat with service personnel. The height may preferably be enough for a person to stand upright in the service boat, the height being for instance two meters. In this way, the underside of the bottom and an underlying infrastructure of the cage may be inspected and maintained above the sea water surface, instead of below the sea water surface as known from the prior art.

The height of the skirt and the required volume of the bottom section needed for sufficient buoyancy to raise the floatable structure may be calculated by a person skilled in the art.

The bottom section may comprise at least one gas inlet and/or gas outlet for a gas.

By means of the gas inlet, a gas source may be connected to the bottom section for distribution of gas inside the bottom section. The gas inlet and/or outlet may be part of a gas supply line. The gas may be supplied by a compressor or a fan. The gas inlet and/or outlet may be arranged on the outside of the skirt. The gas inlet and/or outlet may be arranged such that it is accessible from a boat, independently of the floating depth of the structure.

A compressor or a fan may be arranged on the floatable structure. Alternatively, the compressor or fan may be arranged on a boat or a floating means.

In one embodiment, the cage may be closed. In a closed cage waste, such as faeces, food, and dead fish, will not be distributed to the water outside the cage. The waste may be brought to shore for treatment or destruction. The closed cage also prevents lice and algae harmful to fish to access the cage. A closed cage may give additional buoyancy, for instance when water is pumped out or the cage is empty.

When raising a closed cage holding water, the raise may be used to create a higher water pressure inside the cage compared to a water pressure outside the cage. Creating a raised water surface inside the cage compared to the sea water surface gives a water pressure inside the cage which is equal to the height difference between the inside water level inside the cage and outside the cage.

The increased water pressure may for instance be used to give a pressurized transfer of fish through a submerged hose from a first fish cage to a second neighboring fish cage without the need for a pumping device. The increased water pressure may also be used for transferring the fish to a well boat via a house arranged below the water surface. A submerged transfer of the fish as described herein, may give less stress on the fish compared to a transfer above the water surface as known from prior art.

The floating draft of the floatable structure is affected by the weight of the structure, the size of the bottom section and the amount of water inside the cage.

The bottom section may comprise at least one bulkhead dividing the bottom section into at least two buoyancy sections.

The effect of dividing the bottom section into at least two buoyancy sections, the buoyancy sections being individual, is that it is easier to keep the floatable structure stable when adding and removing the gas to and from the bottom section, and when the gas is transferred inside the bottom section.

In one single section, all the gas may evacuate from one side to another of the bottom section if the floatable structure is not level, causing further instability and in worst case capsizing. When the gas is trapped in two or more smaller separated sections, each section has a buoyancy volume, reducing the risk of further instability and capsizing.

By supplying an unequal amount of gas in at least two buoyancy sections, the floatable structure may be positioned in a non-level position, also known as a heel. The heel may be used to move water to one side of the cage, for instance to an outlet for transferring fish from the cage to a well boat or a waste bin.

At least one bulkhead is arranged in a radial direction relative to a vertical centre axis of the floatable structure When arranged in a radial direction it should be understood that the bulkhead, or a plan extending from the bulkhead, intersects with the centre axis.

The effect of the radial direction of the bulkhead, is that the bottom section may be divided into two or more equally sized and positioned buoyancy sections arranged around the centre axis of the structure. The floatable structure may comprise a circular base area, enabling manufacturing of one type of bulkhead only when the bulkheads are arranged in a radial direction. A circular structure may improve the ability to keep the centre of gravity in the centre of the floating structure.

The bottom section may comprise three bulkheads forming three evenly divided buoyancy sections. The effect having three evenly divided buoyancy sections, is that a first buoyancy section may be open to atmosphere and without buoyancy, whilst a second and a third buoyancy sector may have sufficient buoyancy to keep the floatable structure raised and stable. If the buoyancy is unevenly distributed, a heel may occur.

The floatable structure may comprise a centre column with a tubular shape, where an inner edge of the bulkhead may be attached to the centre column. The bulkhead may further comprise an upper edge, an outer edge and a lower edge. The upper edge may be connected to the bottom side of the bottom. The outer edge may be connected to the skirt. To achieve the buoyancy described above, the sealing between the bulkhead, the column, the bottom and the skirt needs to be gas tight.

The bottom section may comprise an even number of bulkheads, forming an equivalent number of opposing buoyancy sections.

The effect of an even number of bulkheads, for instance 4, 6 or 8, forming an equivalent number of opposing and individual buoyancy sections, is that two opposing buoyancy sections may be open to atmosphere at the same time, and thereby give the floatable structure a symmetrical buoyancy around the centre axis.

In a preferred embodiment the opposing buoyancy sections may have an equal buoyancy. For safety reasons, the bottom section may include more buoyancy sections than needed to keep the floatable structure in a raised position. The required numbers and the sizes of the buoyancy sections may be calculated by a person skilled in the art.

A portion of at least one bulkhead may be arranged in a non-radial direction.

The effect of the non-radial arrangement of the bulkhead, is that one or more buoyancy sections extending from the skirt and in direction to the centre of the structure, may be divided in at least an outer and an inner buoyancy section, and thereby create several buoyancy sections.

It should be clear that the bulkheads described herein are arranged below the bottom when the floating structure is in the operational position.

Each buoyancy section may comprise a gas inlet and/or a gas outlet. At least one gas inlet and/or gas outlet may be connected to a valve. The valve may be arranged to distribute the gas from the gas source and to more than one buoyancy sections or drain gas from the buoyancy sections. All buoyancy sections may be filled with or drained of gas via the said valve. The buoyancy sections may be supplied with or drained of gas simultaneously or individually.

At least one bulkhead may comprise a gas valve arranged to transfer gas from a first buoyancy section to a second buoyancy section.

The effect of the gas valve arranged in the bulkhead, is to enable equalization of the air pressure in two or more buoyancy sections, for instance if there is a leak in a buoyancy sector. The valve may be used when raising or lowering the floatable structure to ensure the floatable structure is levelled.

The skirt may comprise at least one door giving access from the outside of the bottom section and to the inside of the bottom section.

The effect of the door is that the floating service means may float from the outside and to the inside of the bottom section when the floatable structure is raised to a position where the bottom is above the water surface, as described above. The skirt may comprise several doors. The skirt may comprise one door for each buoyancy section. The door may be a hatch.

A door may be arranged in a bulkhead, enabling said floating service means to move from a first buoyancy section to a second buoyancy section arranged inside the bottom section.

In a second aspect the invention relates more particularly to a method for raising a floatable structure according to the first aspect of the invention in a water column, where the method comprises steps of:
connecting a supply line for a gas to the bottom section; and
supplying the gas into the bottom section.

The method for raising the floatable structure, wherein the bottom section is divided into at least a first and a second buoyancy section, the method may further comprise the step of:
supplying the gas into at least the first and the second buoyancy sections, where the gas is supplied in a sequence and with a volume ensuring the floatable structure to raise in the water column keeping the vertical centre axis in its vertical position.

The effect of a sequential supply of gas in at least two buoyancy sections, is that a floatable structure with multiple buoyancy sections may be raised with the centre axis in the vertical position. If the floating structure comprises for instance eight buoyancy sections, opposing buoyancy sections may be filled after each other to avoid an undesirable heel. If the eight buoyancy sections are clockwise and consecutively numbered from 1 to 8, a possible sequential gas filling may be 1, 5, 3, 7, 2, 6, 4 and 8.

In one embodiment, it would be beneficial to start filling the buoyancy sections arranged closest to a centre of gravity of the floatable structure and continue filling sections outwards from the centre of gravity.

The method for raising the floatable structure, wherein the skirt comprises at least one door giving access from the outside of the bottom section and to the inside of the bottom section.

The method for raising the floatable structure, the method may comprise the following steps:
supplying gas in a plurality of buoyancy sections, giving sufficient buoyancy for lifting the bottom in a height above a sea water surface giving room for a floating service means below the bottom;
opening a first door to a first buoyancy section, accessing the first buoyancy section with the floating service means and servicing the first buoyancy section, leaving the first buoyancy section and closing the first door;
filling the first buoyancy section with gas to arrange buoyancy;
opening a second door to a second buoyancy section, accessing the second buoyancy section with the floating service means and service the second buoyancy section, leaving the second buoyancy section and closing the second door;
filling the second buoyancy section with gas; and
repeating the last four steps above until all selected buoyancy sections are serviced.

The effect of the above steps is that the underside of the bottom including potential infrastructure may be accessible above the sea water surface, eliminating the need for submerged operations comprising a ROV or a diver.

When the first buoyancy section is serviced, and the door is closed, the first buoyancy section may be filled with gas to create a buoyancy. Then a second buoyancy section may be accessed and serviced. This sequence may be repeated until all buoyancy sections are serviced. By accessing the buoyancy sections in such a sequence, where only one buoyancy section is open to atmosphere at a time, all buoyancy sections may be accessed whilst the floating structure is kept in a stable and levelled position.

More than one buoyancy section may be open to atmosphere at the same time, provided that the remaining buoyancy sections have enough buoyancy to keep the floating structure floating and stable in a desired position. If two buoyancy sections are open to atmosphere at the same time, said buoyancy sections may preferably be opposing each other to keep the cage on even keel.

The method for raising the floatable structure may comprise the step of:

supplying an unequal amount of gas in at least two buoyancy sections, giving the floatable structure a heel enabling water inside the cage to move to one side of the cage.

The effect of giving the floatable structure said heel, is to allow water inside a closed cage to flow to one side of the cage, for instance to a waste bin, a water outlet or fish outlet. Said outlet may comprise a pump and connections for a house arranged for transferring the waste, the water or the fish to for instance a container, a well boat or another cage.

By giving the floatable structure a controlled heel, the closed cage may be completely emptied by pumping out water from a single point only. The heel may be especially advantageous if the bottom is upward conical. Faeces and waste may accumulate and prevent water to flow along a narrow and essential horizontal periphery created by the cone shape. By adding a heel to the floatable structure, a water flow may be created along the periphery, in which said water flow may overcome and bring along possible obstacles to an outlet or a waist bin.

If the bottom needs maintenance and there still is some water inside the cage, the heel may be shifted around the centre axis in an angle which causes half the bottom too be above the inside water surface. By shifting the heel 360 degrees, the whole bottom may be accessible in dry conditions during the 360-degree cycle.

EXAMPLES OF THE INVENTION

In the following are described examples of preferred embodiments illustrated in the ac-companying drawings, wherein.

Figure 1:
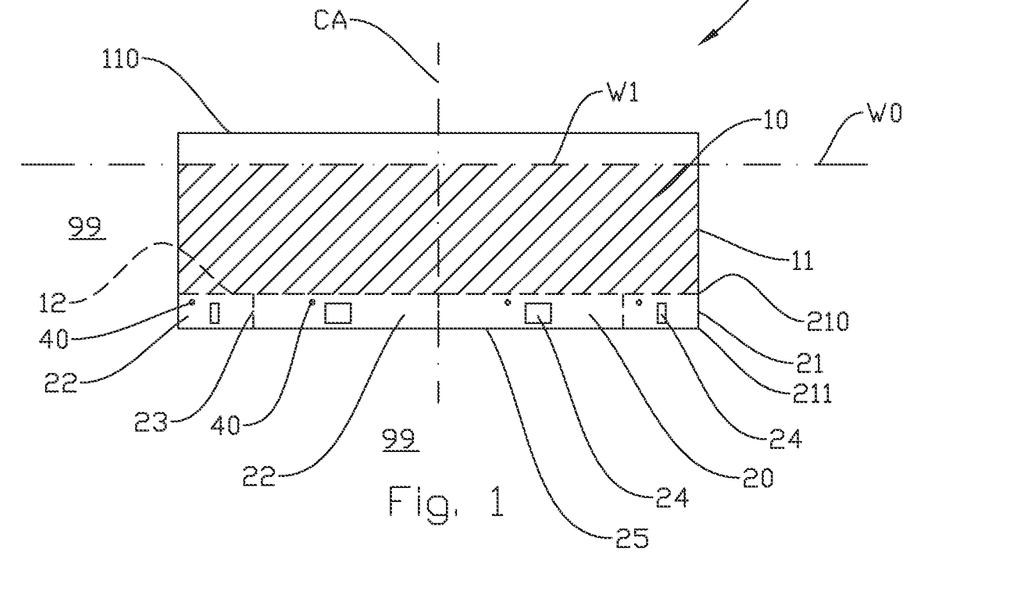
FIG. 1 shows a side view of a floatable structure.

FIG. 1 shows a side view of a floatable structure 1 comprising a closed cage 10 and a bottom section 20. The floatable structure 1 is shown in a typical operational position in a water column 99, where a water surface W1 inside the cage 10 is at the same level as an outside water surface W0, the outside water surface W0 shown as a sea water surface. A centre axis CA is vertical when the floatable structure 1 is levelled.

The closed cage 10 comprises a wall 11 and a bottom 12. The wall 11 being provided with buoyancy elements (not shown) keeping the structure floating when the closed cage 10 is filled with water.

A bottom section 20 is formed by the bottom 12 and a surrounding skirt 21. The skirt 21 extends in downwards direction from the wall 11. The skirt 21 has an upper edge 210, a lower edge 211 and a plurality of doors 24. The doors 24 are arranged in the skirt 21 and the bulkheads 23, giving access for a floating service means 85, shown as a boat in FIGS. 7 and 8 to the buoyancy sections 22. The bottom section 20 comprises at least one gas inlet and/or gas outlet 40.

An underside 25 of the bottom section 20 is open, giving the bottom section 20 a shape as an air bell.

Figure 2:
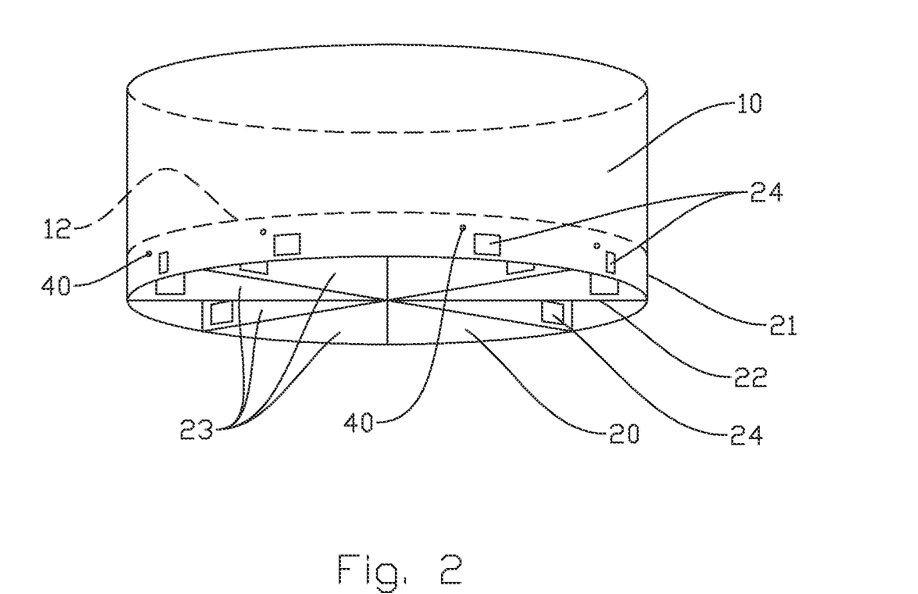
FIG. 2 shows a perspective view of the floatable structure from below.

FIG. 2 shows a perspective bottom-up view of the floatable structure 1. The bottom section 20 is here shown with eight bulkheads 23, dividing the bottom section 20 into eight buoyancy sections 22. Each bulkhead 23 comprising a door 24.

Figure 3:
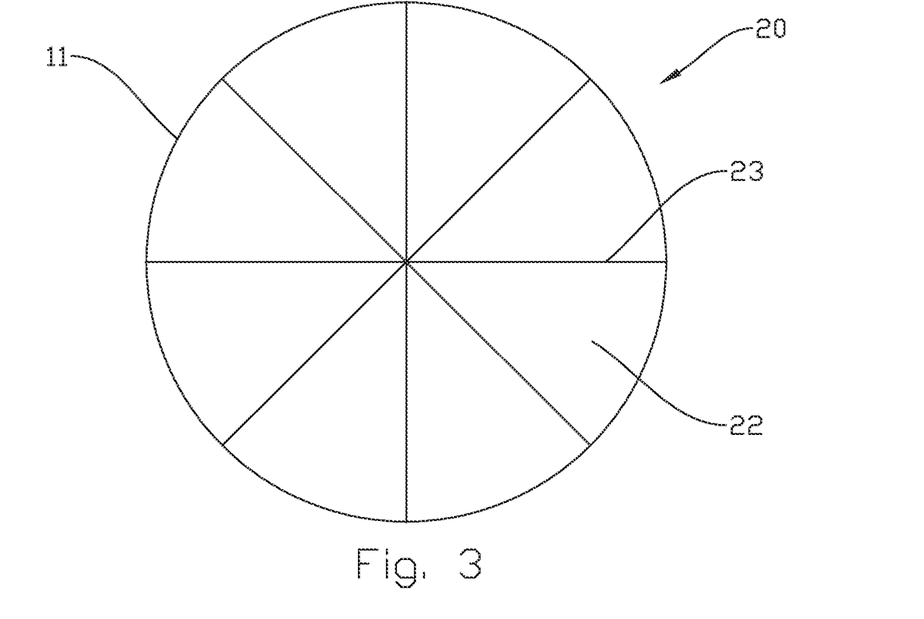
FIG. 3 shows a top view of a first embodiment of the bottom section.

FIG. 3 shows the floatable structure 1 from the underneath. The bottom section 20 comprises eight radial arranged bulkheads 23, dividing the bottom section 20 into 8 buoyancy sections 22.

Figure 4:
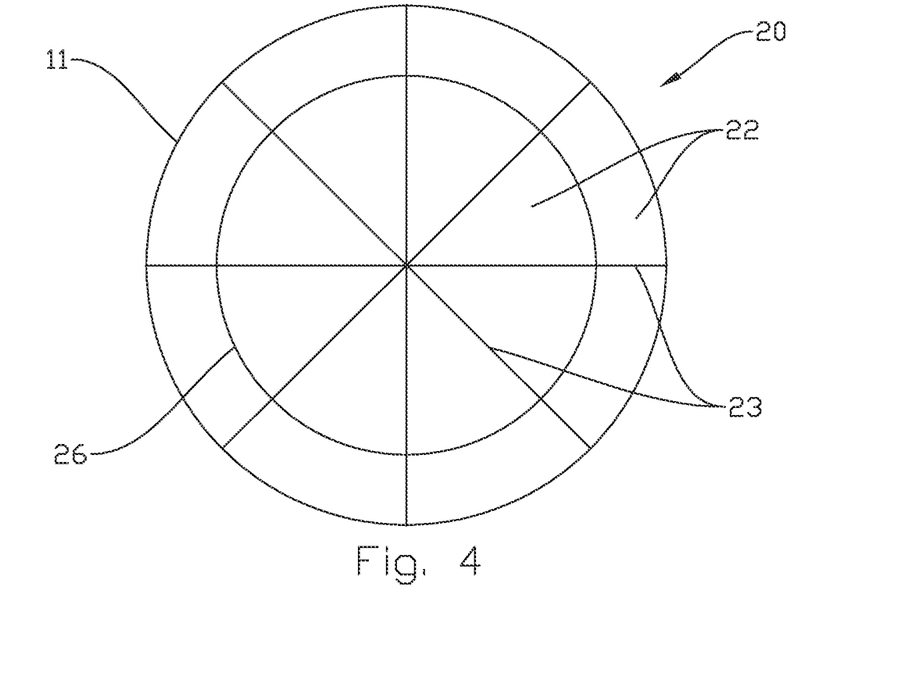
FIG. 4 shows a top view of a second embodiment of the bottom section.

FIG. 4 shows the bottom section 20 comprising eight radially arranged bulk heads 23 and eight non-radial arranged bulkheads 26, dividing the bottom section 20 into 16 buoyancy sections 22. The non-radial bulkheads are shown as curved bulkheads forming a circle.

Figure 5:
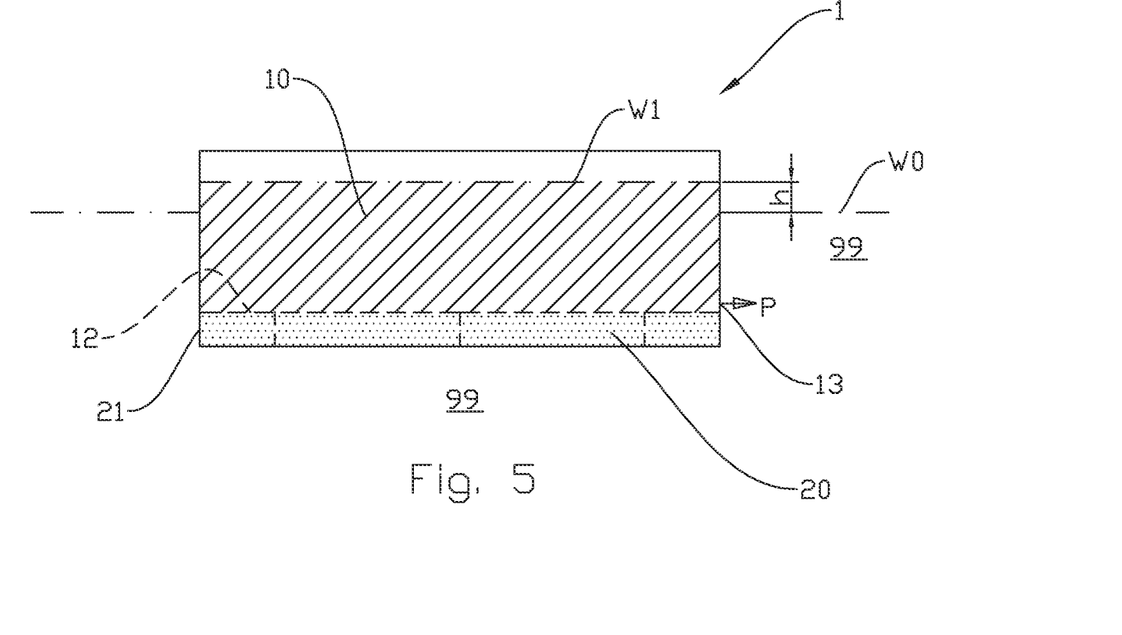
FIG. 5 shows a side view of the floatable structure in a first floating position.

FIG. 5 shows the floating structure 1 in a first floating position. The closed cage 10 is filled with water and the bottom section 20 is filled with a gas, the gas giving sufficient buoyancy for lifting the floating structure 1 a height h. The inside water surface W1 has a height h above the outside water surface W0, the height difference generating a pressure P inside the closed cage 10, where the overpressure P equals the height h.

Figure 6:
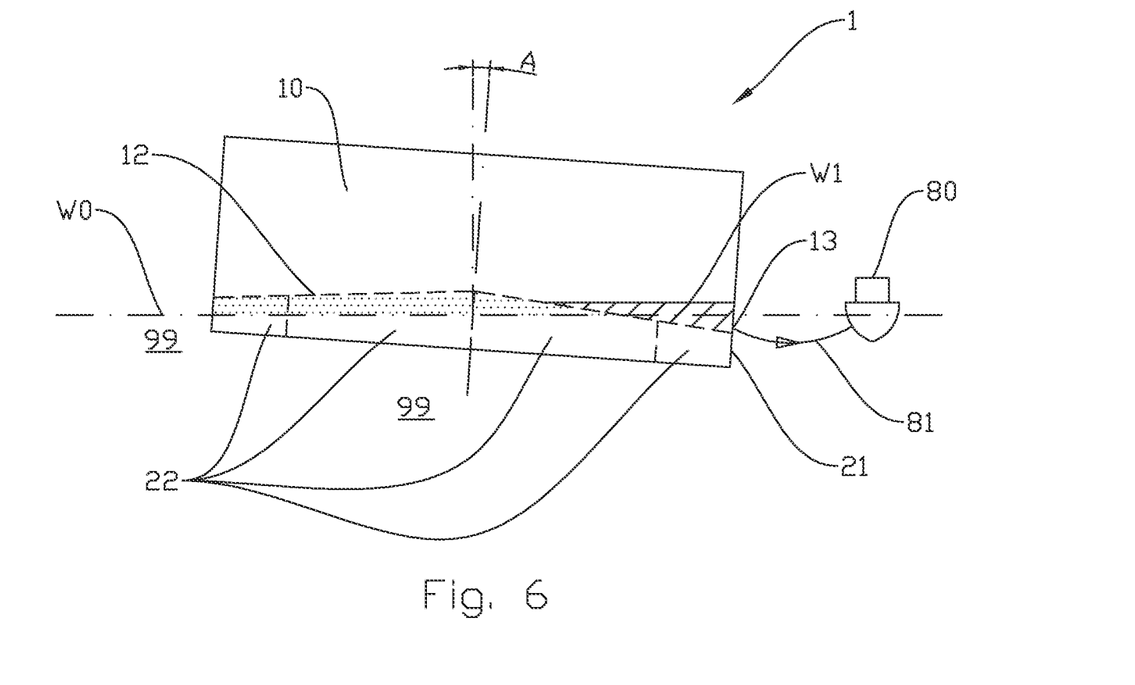

FIG. 6 shows the floating structure 1 in a second floating position, the floating structure 1 having a heel A. The heel A is achieved by filling the buoyancy sections 22 with an uneven amount of gas, giving the floating structure 1 the uneven buoyancy. The heel A is arranged such that the water inside the closed cage 20 flows to an outlet 13. The outlet 13 is connected to a well boat 80 via a hose 81, the hose 81 arranged for transferring fish from the cage 10 and to the well boat 80. The bottom 12 in FIG. 6 is shown with a conical shape.

Figure 7:
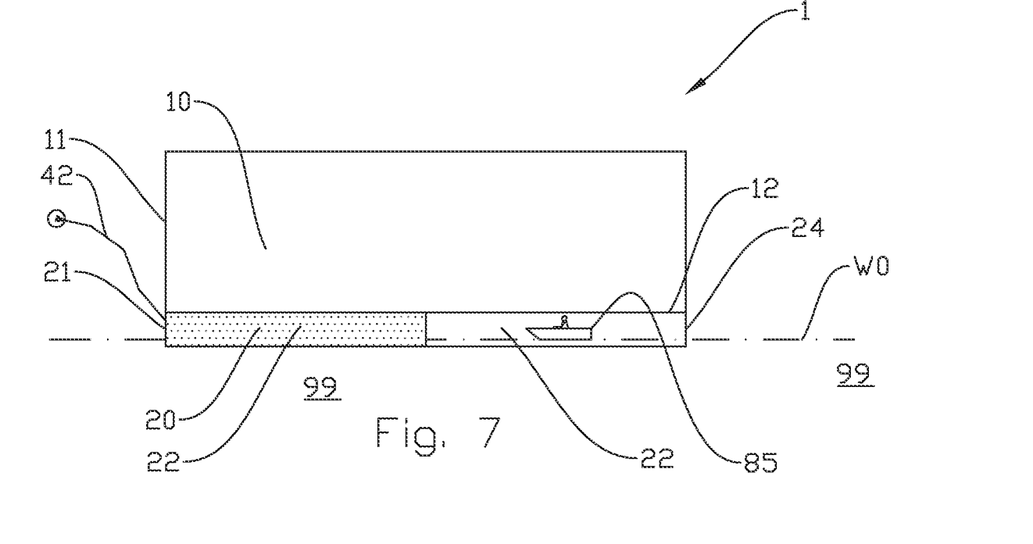
FIG. 7 shows a side view of the floatable structure in a service position.
Figure 8:
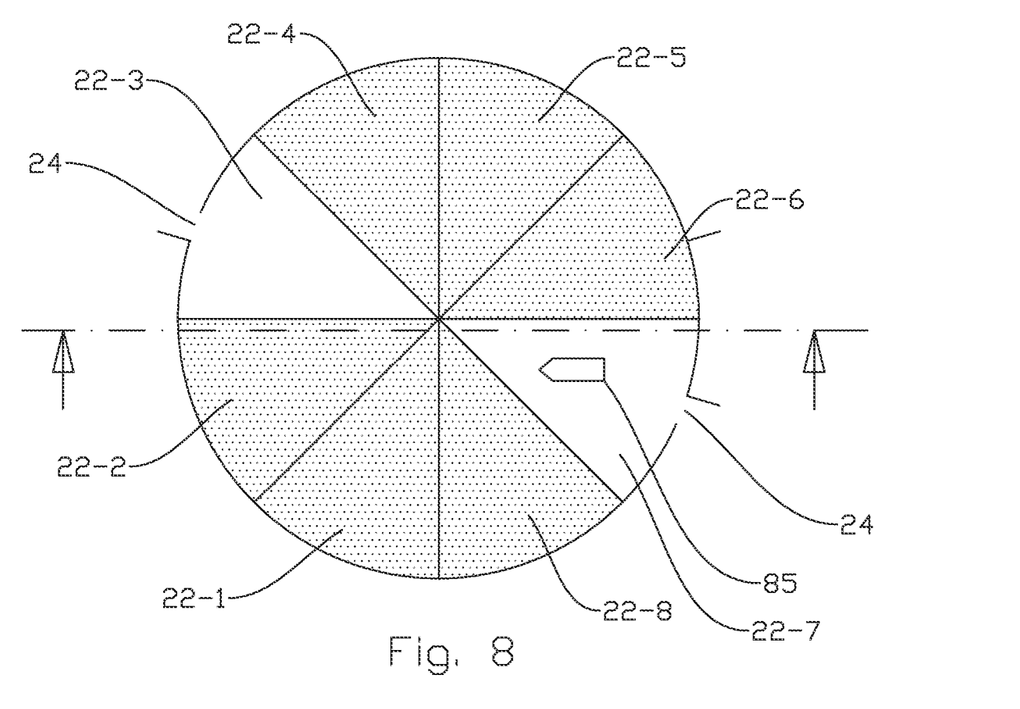
FIG. 8 shows top view of the floatable structure in a service position.

FIGS. 7 and 8 show in a cross-section view (FIG. 7) and a top view (FIG. 8) the floating structure 1 in a third floating position, more specifically in a service position. The service position shown in FIG. 7 is applicable for a closed cage 10 which is empty of water or an open cage 10.

The bottom section 20 comprises eight buoyancy sections 22-1 to 22-8. The six buoyancy sections 22-1-2-4-5-6-8 are filled with gas through a supply line 42, giving the floatable structure 1 enough buoyancy for the bottom 12 to be positioned above the water surface W0, giving room for the service boat 85 to operate below the bottom 12.

The two remaining buoyancy sections, 22-3 and 22-7, have no buoyancy as their doors 24 are open to air, giving access for the service boat 85. When the buoyancy sections 22-3 and 22-7 are serviced, the service boat 85 leaves the bottom section 20. The doors 24 are then closed and buoyancy sections 22-3 and 22-7 are filled with gas. Then two other adjacent buoyancy sections, for instance 22-8 and 22-4, may be opened and made available for the service boat 85.

The invention claimed is:

1. A floatable structure for fish farming in a body of water, the floatable structure comprising
 a cage having a surrounding wall and a bottom, wherein together the surrounding wall and the bottom are configured to retain fish; and
 a surrounding skirt extending downwardly from the bottom, wherein the surrounding skirt and the bottom together define a bottom section that is open to the body of water and together with the body of water retains a gas for providing buoyancy to the floatable structure;
 wherein the bottom section comprises at least one bulkhead dividing the bottom section into at least two buoyancy sections.

2. The floatable structure according to claim 1, wherein the bottom section comprises at least one of a gas inlet and a gas outlet.

3. The floatable structure according to claim 2, wherein at least one bulkhead is arranged in a radial direction relative to a vertical center axis of the floatable structure.

4. The floatable structure according to claim 1, wherein at least one bulkhead is arranged in a radial direction relative to a vertical center axis of the floatable structure.

5. The floatable structure according to claim 4, wherein the bottom section comprises an even number of bulkheads, forming an equivalent number of opposing buoyancy sections.

6. The floatable structure according to claim 1, wherein the bottom section comprises an even number of bulkheads, forming an equivalent number of opposing buoyancy sections.

7. The floatable structure according to claim 1, wherein a portion of at least one bulkhead is arranged in a non-radial direction.

8. The floatable structure according to claim 1, wherein the surrounding skirt comprises at least one door giving access from outside of the bottom section and to inside of the bottom section.

9. A method for raising a floatable structure for fish farming in a body of water, the floatable structure comprising
 a cage with a surrounding wall and a bottom, wherein together the surrounding wall and the bottom are configured to retain fish; and
 a surrounding skirt extending downwardly from the bottom, wherein the surrounding skirt and the bottom together define a bottom section that is open to the body of water and together with the body of water retains a gas for providing buoyancy in a water column to the floatable structure,
 the method comprising the steps of:
  connecting a supply line for a gas to the bottom section;
  supplying the gas into the bottom section, wherein the bottom section is divided into at least a first and a second buoyancy section; and
  supplying the gas into at least the first and the second buoyancy sections, where the gas is supplied in a sequence and with a volume arranging the floatable structure to raise in the water column keeping a vertical center axis of the floatable structure substantially in its vertical position.

10. The method according to claim 9, wherein the method further comprises the following steps:
 supplying the gas in a plurality of buoyancy sections, giving sufficient buoyancy for lifting the bottom to a height above a sea water surface giving room for a floating service means below the bottom;
 opening a first door to a first buoyancy section in the plurality of buoyancy sections, accessing the first buoyancy section with the floating service means and servicing the first buoyancy section, leaving the first buoyancy section and closing the first door;
 filling the first buoyancy section with gas to increase buoyancy;
 opening a second door to a second buoyancy section in the plurality of buoyancy sections, accessing the second buoyancy section with the floating service means and service the second buoyancy section, leaving the second buoyancy section and closing the second door;
 filling the second buoyancy section with gas to increase buoyancy; and
 repeating the steps above until all selected buoyancy sections are serviced.

11. The method according to claim 9, wherein the method further comprises the step of:
 supplying an unequal amount of gas in at least two buoyancy sections, giving the floatable structure a heel, enabling water inside the cage to move to one side of the cage.

12. The method according to claim 9, wherein the method further comprises the following steps:
 supplying the gas in at least the first and the second buoyancy sections, giving sufficient buoyancy for lifting the bottom to a height above a sea water surface giving room for a floating service means below the bottom;
 opening a first door to the first buoyancy section, accessing the first buoyancy section with the floating service means and servicing the first buoyancy section, leaving the first buoyancy section and closing the first door;
 filling the first buoyancy section with gas to increase buoyancy;
 opening a second door to the second buoyancy section, accessing the second buoyancy section with the floating service means and service the second buoyancy section, leaving the second buoyancy section and closing the second door;
 filling the second buoyancy section with gas to increase buoyancy; and
 repeating the steps above until all selected buoyancy sections are serviced.

13. A floatable structure comprising a cage with a surrounding wall and a bottom, the cage being arranged for fish farming, wherein a surrounding skirt extends in a downward direction from the bottom, wherein at least a portion of the bottom from the surrounding skirt towards a center of the cage is tight, said portion of the bottom and the surrounding skirt forming a bottom section arranged to be filled with a gas giving the floatable structure additional buoyancy, and wherein the surrounding skirt comprises at least one door giving access from outside of the bottom section and to inside of the bottom section.

14. A method for raising a floatable structure comprising a cage with a surrounding wall and a bottom, the cage being arranged for fish farming; wherein a surrounding skirt extends in a downward direction from the bottom, wherein at least a portion of the bottom from the surrounding skirt towards a center of the cage is tight, said portion of the bottom and the surrounding skirt forming a bottom section arranged to be filled with a gas giving the floatable structure additional buoyancy in a water column, the method comprising the steps of:
- connecting a supply line for a gas to the bottom section;
- supplying the gas into the bottom section;
- supplying the gas in a plurality of buoyancy sections, giving sufficient buoyancy for lifting the bottom to a height above a sea water surface giving room for a floating service means below the bottom;
- opening a first door to a first buoyancy section in the plurality of buoyancy sections, accessing the first buoyancy section with the floating service means and servicing the first buoyancy section, leaving the first buoyancy section and closing the first door;
- filling the first buoyancy section with gas to increase buoyancy;
- opening a second door to a second buoyancy section in the plurality of buoyancy sections, accessing the second buoyancy section with the floating service means and service the second buoyancy section, leaving the second buoyancy section and closing the second door;
- filling the second buoyancy section with gas to increase buoyancy; and
- repeating the steps above until all selected buoyancy sections are serviced.

15. A method for raising a floatable structure comprising a cage with a surrounding wall and a bottom, the cage being arranged for fish farming; wherein a surrounding skirt extends in a downward direction from the bottom, wherein at least a portion of the bottom from the surrounding skirt towards a center of the cage is tight, said portion of the bottom and the surrounding skirt forming a bottom section arranged to be filled with a gas giving the floatable structure additional buoyancy in a water column, wherein the bottom section is divided into at least a first and a second buoyancy section, the method comprising the steps of:
- connecting a supply line for a gas to the bottom section;
- supplying the gas into the bottom section;
- supplying the gas into at least the first and the second buoyancy sections, where the gas is supplied in a sequence and with a volume arranging the floatable structure to raise in the water column keeping a vertical center axis of the floatable structure substantially in its vertical position
- supplying the gas in at least the first and second buoyancy sections, giving sufficient buoyancy for lifting the bottom to a height above a sea water surface giving room for a floating service means below the bottom;
- opening a first door to the first buoyancy section, accessing the first buoyancy section with the floating service means and servicing the first buoyancy section, leaving the first buoyancy section and closing the first door;
- filling the first buoyancy section with gas to increase buoyancy;
- opening a second door to the second buoyancy section, accessing the second buoyancy section with the floating service means and service the second buoyancy section, leaving the second buoyancy section and closing the second door;
- filling the second buoyancy section with gas to increase buoyancy; and
- repeating the steps above until all selected buoyancy sections are serviced.

* * * * *